(12) United States Patent
Fujieda et al.

(10) Patent No.: US 6,771,232 B2
(45) Date of Patent: Aug. 3, 2004

(54) MOBILE TERMINAL DEVICE, CONTENT DISTRIBUTION SYSTEM, CONTENT DISTRIBUTION METHOD, AND PROGRAM FOR EXECUTING METHOD THEREOF

(75) Inventors: Ichiro Fujieda, Tokyo (JP); Yuuzou Ikeda, Tokyo (JP)

(73) Assignee: NEC Corporation, Tokyo (JP)

(*) Notice: Subject to any disclaimer, the term of this patent is extended or adjusted under 35 U.S.C. 154(b) by 280 days.

(21) Appl. No.: 10/012,558

(22) Filed: Dec. 12, 2001

(65) Prior Publication Data

US 2002/0070910 A1 Jun. 13, 2002

(30) Foreign Application Priority Data

Dec. 12, 2000 (JP) ........................................ 2000-377035

(51) Int. Cl.[7] ................................................ G09G 3/00
(52) U.S. Cl. ............................ 345/30; 345/55; 345/82
(58) Field of Search ............................... 345/82, 55, 87, 345/205, 206, 30; 359/461; 385/1, 2, 116; 40/547

(56) References Cited

U.S. PATENT DOCUMENTS

| | | | | |
|---|---|---|---|---|
| 4,060,310 A | * | 11/1977 | Brown | 359/461 |
| 5,106,181 A | | 4/1992 | Rockwell, III | |
| 5,128,662 A | * | 7/1992 | Failla | 345/1.3 |
| 5,353,152 A | | 10/1994 | Realmuto | |
| 5,918,395 A | * | 7/1999 | Hesmer | 40/518 |
| 6,498,597 B1 | * | 12/2002 | Sawano | 345/107 |

* cited by examiner

*Primary Examiner*—Dennis-Doon Chow
(74) *Attorney, Agent, or Firm*—Young & Thompson

(57) ABSTRACT

A mobile communication terminal includes a thin AWD (arrayed waveguide display) and a winding device to roll up the display to store the display in a housing. A storage medium on which a content is copied is installed in the mobile terminal. The user pulls the display from the housing to enjoy the content. There is provided a mobile terminal, a content distribution system, a content distribution method, and a program for executing the method thereof. The mobile terminal satisfies a requirement to increase the display area and a requirement to minimize the size of the mobile terminal, and hence can distribute contents using the advantageous features.

22 Claims, 13 Drawing Sheets

10: LIGHT EMITTING MEANS
11: LIGHT EMITTING ELEMENT
12: OPTICAL AXIS
20: WAVEGUIDE ARRAY
21: WAVEGUIDE
22: SUPPORTING SUBSTRATE
30: LIGHT EXTRACTING MEANS
31: LIQUID CRYSTAL LAYER
32: LIQUID CRYSTAL SEALING MATERIAL
33: TRANSPARENT SUBSTRATE
34: ELECTRODE
38: TERMINAL
40: LIGHT REFLECTING MEANS

FIG. 8

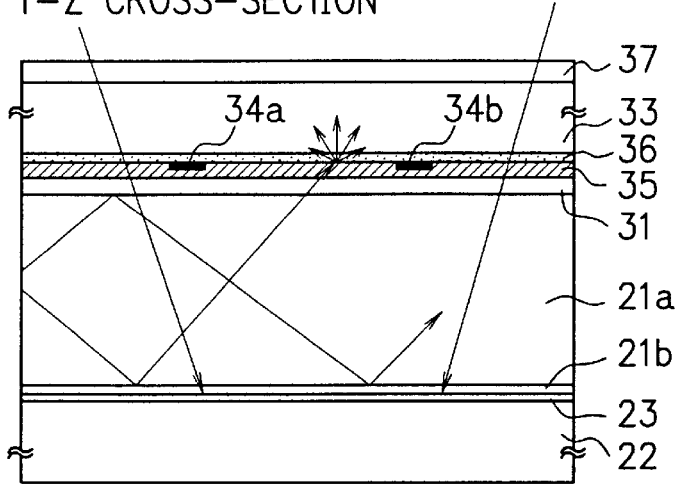

Y-Z CROSS-SECTION

- 21a: WAVEGUIDE CORE
- 21b: WAVEGUIDE CLAD
- 22: SUPPORTING SUBSTRATE
- 23: LIGHT ABSORBING LAYER
- 31: LIQUID CRYSTAL LAYER
- 33: TRANSPARENT SUBSTRATE
- 34a: FIRST ELECTRODE
- 34b: SECOND ELECTRODE
- 35: ALIGNMENT LAYER
- 36: LIGHT SCATTERING LAYER
- 37: ANTIREFLECTION LAYER

FIG. 9

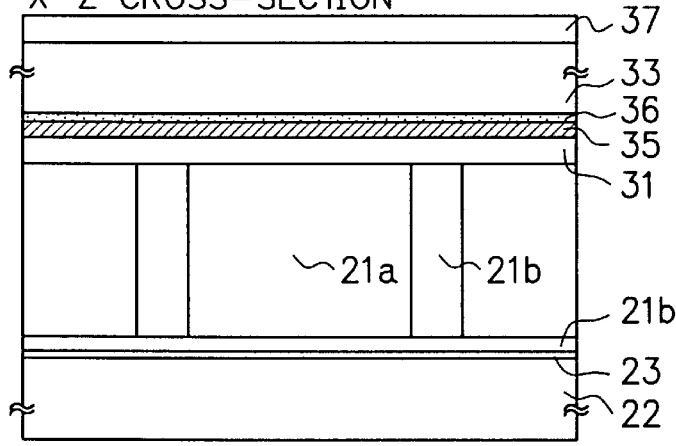

X-Z CROSS-SECTION

- 21a: WAVEGUIDE CORE
- 21b: WAVEGUIDE CLAD
- 22: SUPPORTING SUBSTRATE
- 23: LIGHT ABSORBING LAYER
- 31: LIQUID CRYSTAL LAYER
- 33: TRANSPARENT SUBSTRATE
- 34a: FIRST ELECTRODE
- 34b: SECOND ELECTRODE
- 35: ALIGNMENT LAYER
- 36: LIGHT SCATTERING LAYER
- 37: ANTIREFLECTION LAYER

60: TRANSPARENT SUBSTRATE
61: LIGHT SHIELDING LAYER
62: BARRIER LAYER
63: CHANNEL REGION OF TFT
64: SOURCE-DRAIN REGION OF TFT
65: GATE INSULATING LAYER
66: GATE ELECTRODE
67: INSULATING LAYER
68: SOURCE-DRAIN ELECTRODE
69: PLANARIZATION LAYER
70: TRANSPARENT ELECTRODE
71: ORGANIC EL LAYER
72: OPAQUE ELECTRODE
73: SEALING LAYER

10: LIGHT EMITTING MEANS
20: WAVEGUIDE ARRAY
30: LIGHT EXTRACTING MEANS
40: LIGHT REFLECTING MEANS

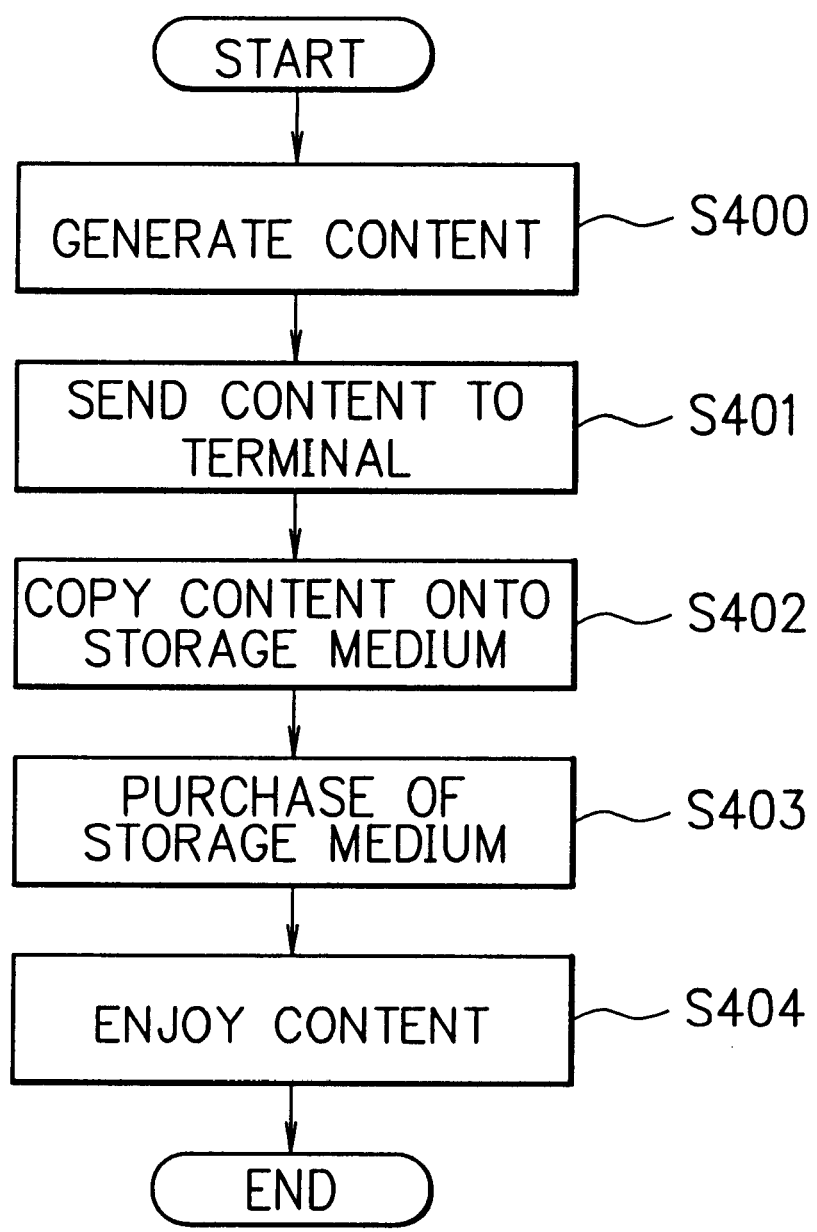

MOBILE TERMINAL DEVICE, CONTENT DISTRIBUTION SYSTEM, CONTENT DISTRIBUTION METHOD, AND PROGRAM FOR EXECUTING METHOD THEREOF

BACKGROUND OF THE INVENTION

The present invention relates to a mobile terminal device including a novel arrayed waveguide display (AWD), a content distribution system, a content distribution method, and a program for executing method thereof Description of the Prior Art A portable terminal device having a wide display area and excellent portability is regarded as an ideal form of a mobile terminal. Description will be given for existing portable terminal devices in consideration of uses and portability thereof.

First, the display area of the display screen should be considered as a usage index for the following reasons. For a portable terminal device, an appropriate display area is determined according to a primary use of the portable terminal device. For example, an ordinary portable telephone to be primarily used for voice communication has a display area with a diagonal of approximately two inches. Personal digital assistants (PDAs) having primary functions of schedule management, document creation, and calculation using a spreadsheet have a display area with a diagonal of four to six inches. In this connection, when the terminal device is to be used also as an electronic book, the diagonal will range from seven inches to eight inches.

Second, although volume, weight, successive operation time, and the like can be considered as indices of portability, description will be given primarily of the simplest factor, namely, the volume. To increase the display area, it is naturally necessary to use a large-sized display, and hence a size of the portable terminal device becomes greater. Conversely, when portability is given a preference, the display area becomes smaller. That is, a trade-off exists between the amount of displayed information and the portability in general.

An exceptional example is a portable terminal device including a micro-display in which an image is magnified by a magnifying optical system. In some devices of this type, it is possible to display information equivalent to an extended graphics array (XGA) format with a display having a diagonal of one inch or less. However, to see an image, the user must look into the display as in the case of a viewfinder. It is quite questionable if a user accept this cumbersome usage.

SUMMARY OF THE INVENTION

It is therefore an object of the present invention, which has been devised to remove the problem, to provide a mobile terminal device, a content distribution system, a content distribution method, and a program for executing method thereof, the portable terminal device satisfying a requirement of a large display area and a requirement of minimization of the size of the mobile communication terminal device to distribute contents using its advantageous features.

In accordance with the present invention, there is provided a mobile terminal device, comprising a thin-film AWD (arrayed waveguide display) and a winding device for rolling up the display in a housing and storing the display therein.

The display favorably comprises a light emitting array including a plurality of a light emitting array for emitting light for displaying image by line-by-line basis, a light guiding array for guiding light from one end to the other end through the light guiding array, and light extracting means for extracting the light propagating through the light guiding array from an arbitrarily selected area of the light guiding array.

The light guiding array preferably is made of a material of polymer.

The mobile terminal device favorably further comprises supporting arms of folding type for supporting the display being extended from the housing.

The mobile terminal device preferably further comprises a window through which a partial image of the display is displayed when the display is rolled up in the housing;

further comprises a slit in the housing and a tab disposed at an end of the display for extending the display through the slit; and/or comprises position detecting device in the vicinity of the slit for detecting a boundary position of the extended display, between an area of the display in the housing and an area thereof outside the housing.

It is preferable that the position detecting device emits light onto a black and white pattern formed on a predetermined area of the display, receives light reflected from the black and white pattern, and detects the boundary position according to the reflected light.

The mobile terminal device preferably comprises control means for controlling the light extracting means and displaying the image only on the area of the display being extended outside the housing, according to a result of the position detection by the position detecting device.

The mobile terminal device favorably comprises an extension unit for connecting a predetermined external device and a storage medium for storing a predetermined content.

It is preferable that the light emitting array is disposed at an end of the display opposing to the end fixedly attached to a central axis of the rolling device.

The housing favorably has a contour of a stick.

In accordance with the present invention, there is provided a content distribution system, comprising a content server for generating a content and for providing the content via a network; a distributor terminal for downloading the content from the content server; and a mobile terminal device including an AWD for reproducing the content copied into a storage medium at the distributor terminal.

The display preferably comprises a light emitting array including a plurality of light emitting elements for emitting light for displaying image by line-by-line basis, a light guiding array for guiding light from one end to the other end through the light guiding array, and light extracting means for extracting the light propagating through the light guiding array from an arbitrarily selected area of the light guiding array.

It is favorable that the content includes data of a moving picture.

In accordance with the present invention, there is provided a content distribution method, comprising preferably three following steps as below. The first step is generating a content by content server and providing the content via a network to a distributor terminal. The second step is copying a content, provided by the content server and downloaded by the distributor terminal, onto a storage medium. The third step is reproducing the content copied onto the storage medium by a mobile terminal including the AWD.

The display favorably comprises a light emitting array including a plurality of light emitting elements for emitting light for displaying image by line-by-line basis, a light guiding array for guiding light from one end to the other end through the light guiding array, and light extracting means for extracting the light propagating through the light guiding array from an arbitrarily selected area of the light guiding array.

In accordance with the present invention, there is provided a program executing the processing that generating a content by content server and providing the content via a network to a distributor terminal; copying a content, provided by the content server and downloaded by the distributor terminal, onto a storage medium; and reproducing the content copied onto the storage medium by a mobile terminal including an AWD (arrayed waveguide display).

The display preferably comprises a light emitting array including a plurality of light emitting elements for emitting light for displaying image by line-by-line basis, a light guiding array for guiding light from one end to the other end through the light guiding array, and light extracting means for extracting the light propagating through the light guiding array from an arbitrarily selected area of the light guiding array.

The content preferably includes data of a moving picture.

BRIEF DESCRIPTION OF THE DRAWINGS

The objects and features of the present invention will become more apparent from the consideration of the following detailed description taken in conjunction with the accompanying drawings in which:

FIG. 8 is a cross-sectional view showing a waveguide array and a light extracting means of an AWD employed in embodiments in accordance with the present invention;

FIG. 9 is another cross-sectional view showing the waveguide array and the light extracting means of an AWD employed in embodiments in accordance with the present invention;

FIG. 19 is a flowchart showing a content distribution method in the fourth embodiment in accordance with the present invention.

DESCRIPTION OF THE PREFERRED EMBODIMENTS

Referring next to the accompanying drawings, description will be given in detail of embodiments in accordance with the present invention. The present invention uses an arrayed waveguide display (referred to "AWD"). The AWD is a display which includes a light emitting array including a plurality of light emitting elements, a waveguide array including a plurality of waveguide means and an photo-extracting means.

First Embodiment

Figure 1:
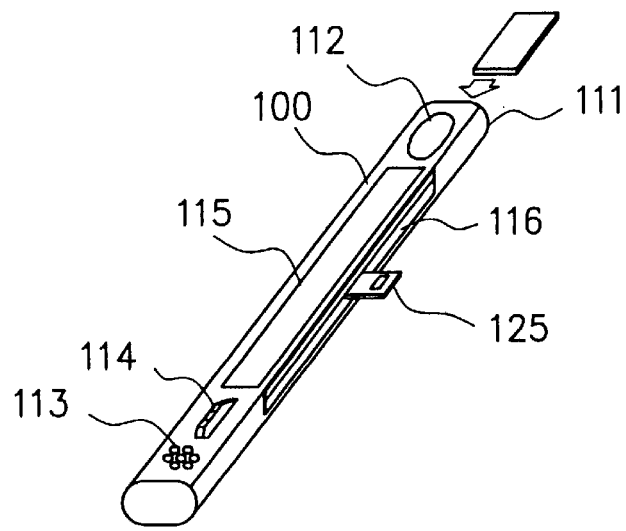
FIG. 1 is a perspective view showing a state of a first embodiment of a mobile terminal device including an arrayed waveguide display (AWD) in accordance with the present invention in which the display is rolled up in the device.

FIG. 1 shows a perspective view of a mobile terminal device in which an AWD is mounted in a first embodiment in accordance with the present invention. The mobile terminal device is preferably a stick type. The AWD is rollable (windable).

The mobile terminal device including the AWD includes a housing 100 as shown in FIG. 1, and the AWD is rolled up in the housing 100. The housing 100 includes an extension unit 111, a speaker 112, a microphone 113, an operation key 114, a window 115, and a slit 116. The housing 100 is about 60 to 150 millimeter (mm) long, about 25 mm wide, and about 15 mm thick.

Installed in the extension unit 111 is a small-sized storage medium, camera, or a device for a global positioning system (GPS). It is also possible to adapt various interface standards in the extension unit 111. For example, a universal serial bus (USB), an Institute of Electrical and Electronics Engineers (IEEE) 1394, or the like may be employed as a communication interface. A headphone terminal may be arranged, in a situation in which a user desires to install in the extension unit 111, for example, a storage medium having stored contents such as a news program. If such a headphone terminal is employed in the extension unit 111, user can enjoy the contents any places even in a train, which will be described later.

The speaker 112 receives audio or voice data from an integrated antenna (not shown), and produces sounds according to the data. The speaker 112 is also used to reproduce sounds when a storage medium having recorded a content of audio data.

A user uses the microphone 113 to communicate with a partner. As mentioned above, the mobile terminal device is about 25 mm wide and about 15 mm thick. Therefore, the user feels that he/she can grasps this mobile terminal device (s) while the user of other mobile terminal device(s) feels that he/she holds the device(s). Additionally, since the mobile terminal device is about 150 mm long, the speaker 112 and the microphone 113 can be used as if it were a handset of the ordinary telephone set.

The operation key 114 is employed for the user to conduct various operations, for example, to input a telephone number. The operation key 114 of FIG. 1 includes a track pointer and a track ball. In this regard, a ten-key pad will be better to input numerical characters. Since the housing 100 is small, it is difficult to arrange three columns of a ten-key pad. A two-column ten-key pad could be employed in the mobile terminal device.

The window 115 provides a function corresponding to a partial display of a portable telephone of folding type. For example, a date, a time, a remaining amount of battery charge, and intensity of received radio waves are displayed in the window 115. The window 115 is implemented by using a part of the AWD 120 in the rolled-up state. The window 115 of the mobile terminal device in this embodiment is about 15 mm wide and about 100 mm long. The AWD 120 includes a display area having a width of about 150 mm and a length of about 100 mm. Therefore, about ten percent of the display area is used for the window 115.

Figure 2:
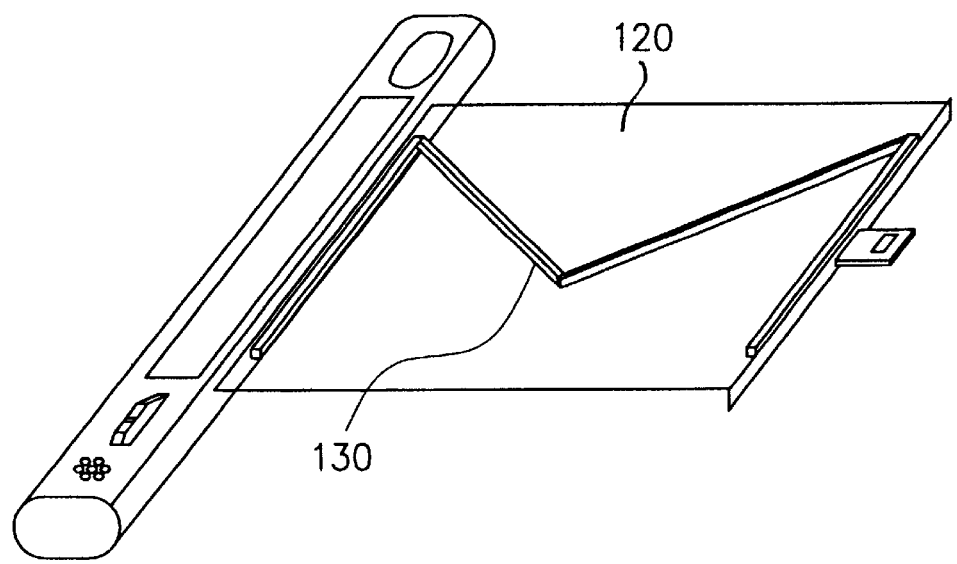
FIG. 2 is a perspective view showing a state of the first embodiment of the mobile terminal device including an AWD in accordance with the present invention in which the display is extended.

The slit 116 is used to extend the AWD 120 from the housing 100. The AWD 120 includes a tab 125 attached onto a tip section thereof. The tab 125 projects from the slit 116. By pulling the tab 125, the user can extend the AWD 120 from the housing 100. The tab 125 can be stored in the housing 100. Only when it is desired to extend the AWD 120, the tab 125 projects from the housing 100 as shown in FIG. 1. FIG. 2 shows, in a perspective view, a state of the first embodiment of the mobile terminal device including AWD in which the AWD is extended.

As mentioned above, the display area of the AWD 120 has a width of about 150 mm and a length of about 100 mm (a diagonal of about 7 inches). The display 120 includes, as a main section, a rollable thin plate made of polymer. Therefore, the user must hold the AWD 120 with two hands to keep the AWD 120 in a flat form. To overcome this difficulty, a supporting device 130 is used to support the AWD 120. As a result, even when the AWD 120 is in the extended state, the user can hold the stick-type mobile terminal device by one hand.

The supporting device 130 includes a foldable arm to support the extended display 120. The supporting device 130 includes one end fixedly attached onto an edge section of the display 120 and another end fixedly attached onto the slit 116. When the display 120 is rolled up, the arm is folded at the side of the slit 116.

Figure 3:
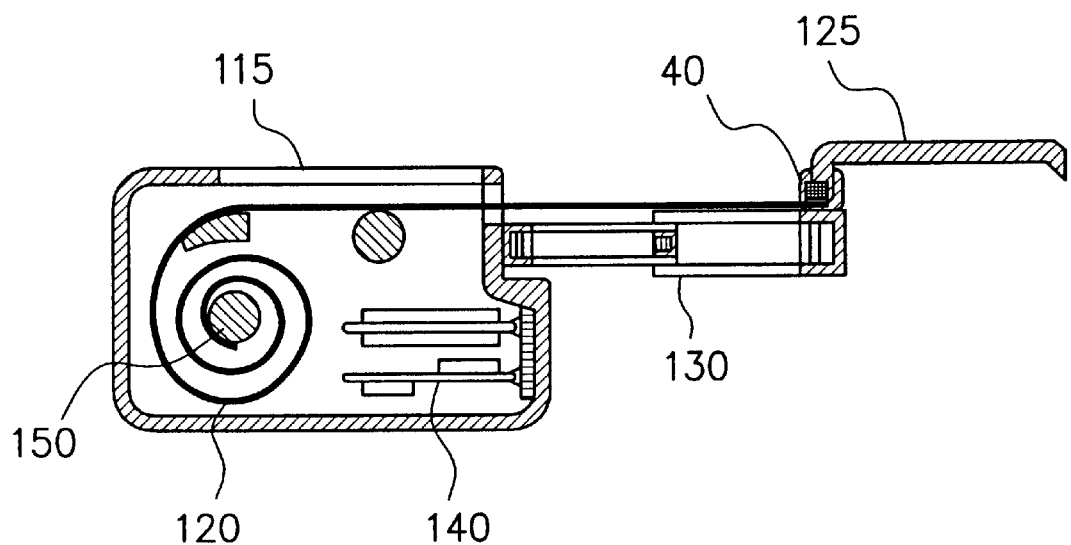
FIG. 3 is a cross-sectional view showing an inner configuration of the first embodiment of the mobile terminal device including an AWD in accordance with the present invention.
Figure 4:
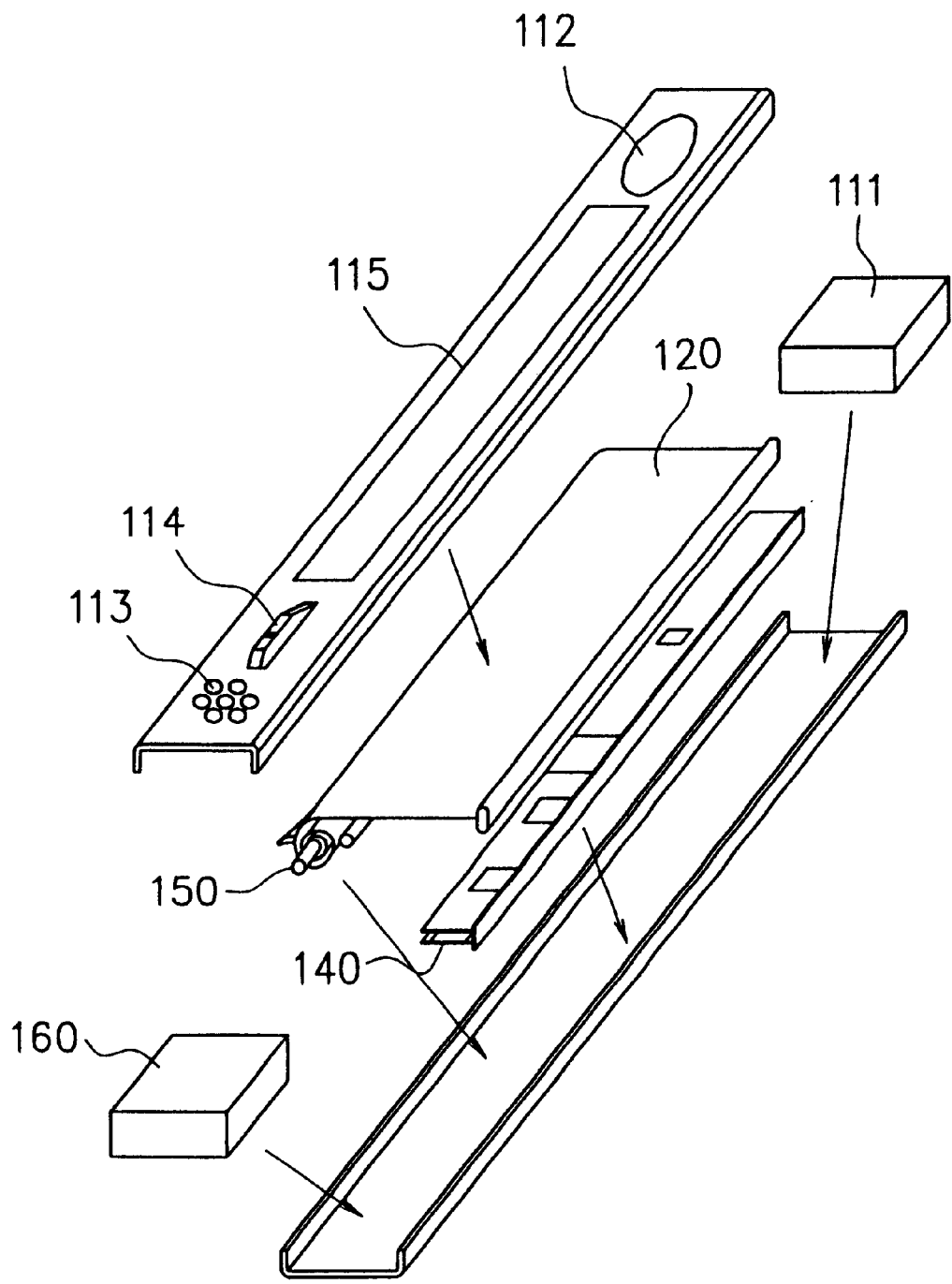
FIG. 4 is an exploded view showing an inner configuration of the first embodiment of the mobile terminal device including an AWD in accordance with the present invention.

FIG. 3 shows, in a cross-sectional view, an inner construction of the first embodiment of the mobile terminal device including an AWD. FIG. 4 is an exploded view also showing the inner configuration of the first embodiment of the mobile terminal device including an AWD.

Arranged in the housing 100 are a printed circuit board (PCB) 140 and a rolling unit 150 on which an end section of the display 120 is attached. The printed circuit board 140 includes one end connected to a battery 160 and another end connected to an extension unit 111.

The rolling unit 150 includes a spring and a cam used in, for example, a window shade and a screen for a projector. To extend the AWD 120, it is only necessary to pull the tab 125. To roll up the display 120, the user slightly pulls the table 125 to disconnect engagement of the cam. The display 120 is then automatically rolled (wound) up by the force of the spring. Alternatively, a button to disengage the cam may be employed. When the button is pressed and the cam is disengaged, the display 120 is automatically rolled up.

The printed circuit board 140 includes a central processing unit (CPU), a read-only memory (ROM), a random access memory (RAM), a display controller, an operation controller, a radio transmitter/receiver section, a modulator/demodulator section, a coder/decoder section, an audio section, a video section, an amplifier section, and so on. By reducing the size of the PCB 140, it is possible to decrease width and thickness of the housing 100.

In the description, the housing 100 is in the form of a stick. However, the shape of the housing 100 is not limited to a stick type shape. It may be a pen-shaped circular cylinder, a pencil-shaped hexagonal shape, an any polygonal cylinder or the like.

Second Embodiment

Figure 5:
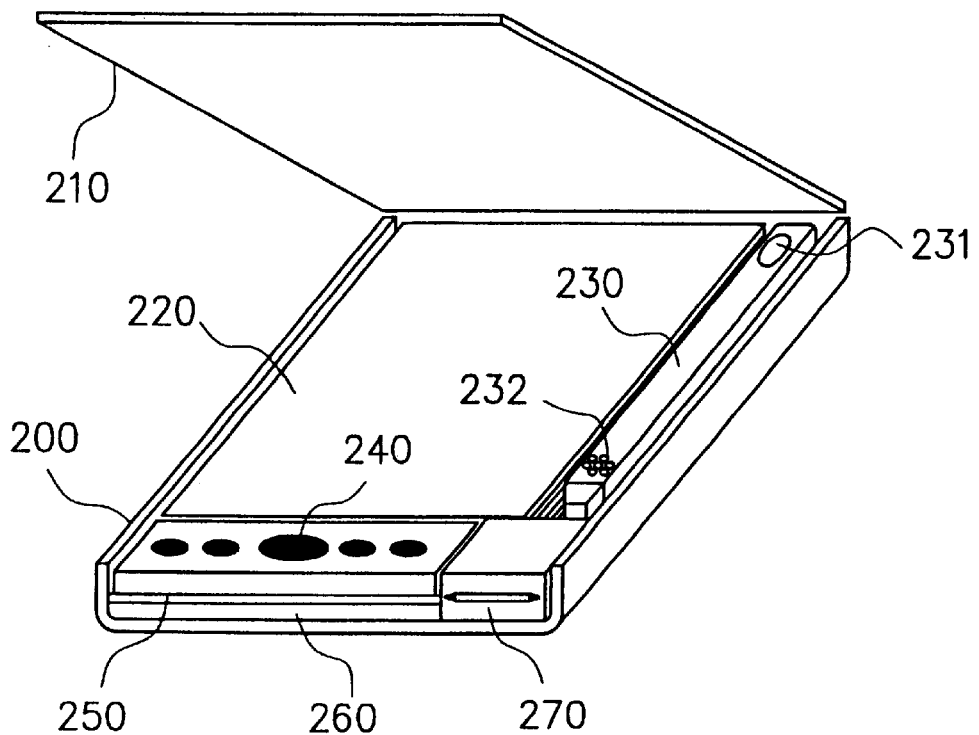
FIG. 5 is a perspective view showing a configuration of a second embodiment of a mobile terminal device including an AWD in accordance with the present invention.

FIG. 5 shows, in a perspective view, a construction of a second embodiment of a mobile terminal device including an AWD in accordance with the present invention. This embodiment differs from the first embodiment in that the terminal device is in the form of a card, not a stick.

The arrayed waveguide display (AWD) is superior to an LCD. That is, the AWD is thin and light weighted, and it can be produced at a low cost. Even if an AWD which cannot be easily rolling up is used, it is possible to implement a card-type terminal shown in FIG. 5. Therefore, the advantages described above can be obtained. There may be used a light guiding substrate which is hard material such as glass in this terminal device when compared with the stick-type terminal device.

The size of the mobile terminal device of the second embodiment is about 80 mm wide, about 100 mm long, and about 5 mm thick. The device includes a housing 200 like a cabinet of a floppy disk. An upper lid as an upper housing (opened in FIG. 5) includes a rear surface serving as a flat speaker 210. The upper lid is also a protective cover of the display. Disposed in the housing 200 are an AWD 220, a handset 230, an operation key 240, a printed circuit board (PCB) 250, a battery 260, and an extension unit 270.

The display 220 includes a display area having a width of about 60 mm and a length of about 80 mm. When a handset 230, functioning also as a stylus, touches on the display, information of the coordinates of the touching point is detected and a signal is sent to the PCB 250 (sent to an electric element such as CPU mounted on the PCB).

The handset 230 includes a speaker 231 and a microphone 232 and can be removed from the housing 200 for a call. The handset 230 also functions as a stylus. A stylus is an input device to input coordinates. In operation, when the stylus points a position, absolute coordinates of the position are inputted to the system. This is different from a mouse. That is, when a mouse is moved, a displacement or a relative distance between the pointed positions is inputted to the system. The handset 230 is connected to the PCB 250 via a cable or a radio communication.

The operation key 240 favorably includes a track pointer and a track ball as in the first embodiment. A ten-key device may be arranged. This embodiment differs from the first embodiment in that the housing has a large width. Therefore, various devices can be selected for the user interface, for example, various operation keys 240 can be disposed and a handset 240 including a radio communication function can be used.

The PCB 250 includes, as in the first embodiment, a CPU, an ROM, an RAM, a display controller, an operation controller, a radio transmitter/receiver section, a modulator/demodulator section, a coder/decoder section, an audio section, a video section, an amplifier section, and the like.

As for the battery 260, either a fuel battery, a lithium-ion battery, a lithium-polymer battery or a nickel-cadmium battery can be used.

In this embodiment, as in the first embodiment, a storage medium, camera, or a GPS device is installed in the extension unit 270. Various interface standards may also be adopted in the extension unit 111. For example, a USB, an IEEE 1394, or the like may be employed as a communication interface. A headphone terminal may be arranged in the extension unit 111.

Third Embodiment

Figure 6:
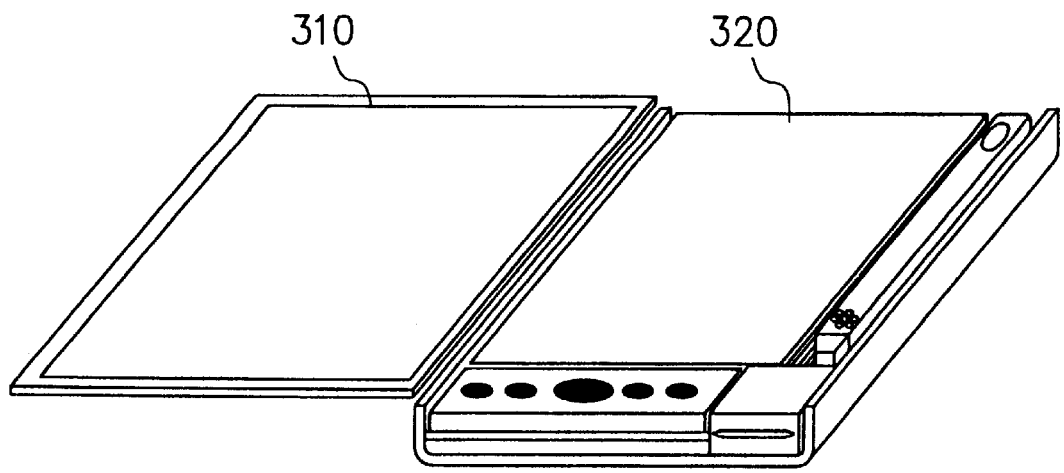
FIG. 6 is a perspective view showing a configuration of a third embodiment of a mobile terminal device including an AWD in accordance with the present invention.

FIG. 6 shows, in a perspective view, a construction of a third embodiment of a mobile terminal device including an AWD in accordance with the present invention.

The mobile terminal device of this embodiment includes two displays which can be opened like two pages of a book as shown in FIG. 6. The third embodiment differs from the first embodiment in that the display area can be increased. This embodiment takes advantage of a feature of the AWD in which thickness of the display section can be decreased.

The mobile terminal device of the third embodiment is basically similar to that of the second embodiment. The terminal includes a lid which can be opened and includes a rear surface serving as a first display 310. The first display 310 has a display area which is about 75 mm wide and about 95 mm long. In this embodiment, as well as in the second embodiment, a second display 320 is disposed in a housing 300. The second display 320 receives input by a stylus and has a display area with a width of about 60 mm and a length of about 80 mm. The lid including the first display 310 is also used as a protective cover for the second display 320.

In this regard, the AWD is quite thin in the card-type mobile terminal device. Therefore, the display may be constructed in various ways. For example, the AWD includes three displays like a three-sided mirror or five displays which are opened in a shape of a cross.

Next, description will be given of a principle of the AWD.

Figure 7:
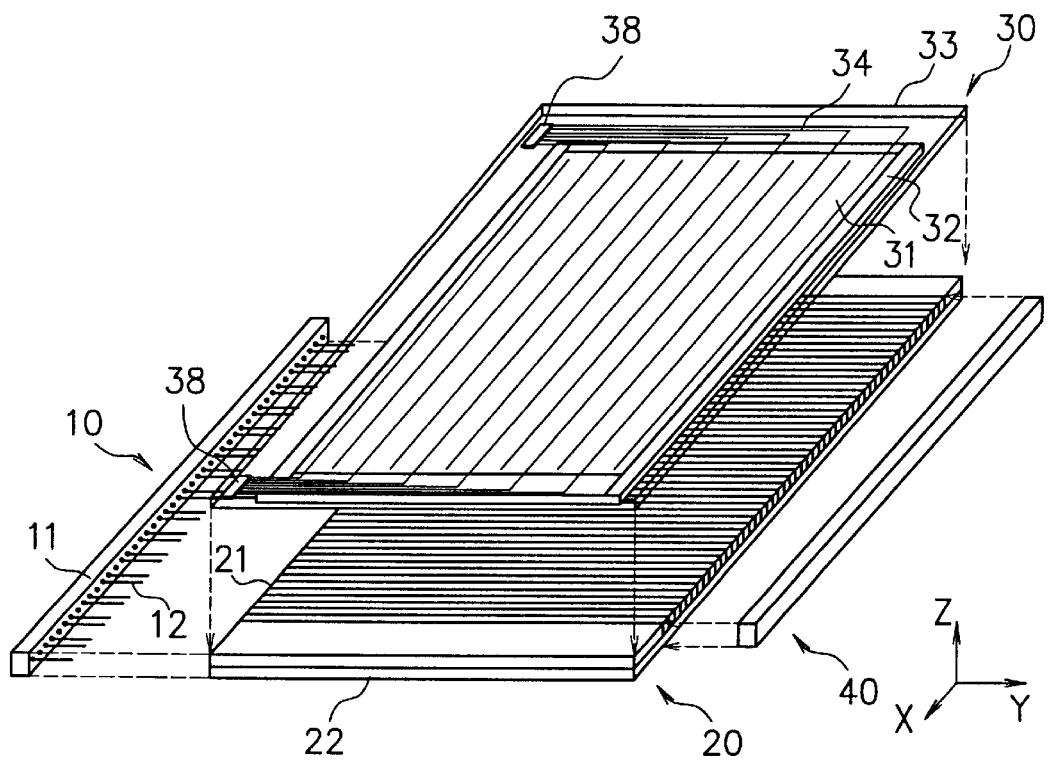
FIG. 7 is an exploded view showing a basic configuration of an AWD employed in embodiments in accordance with the present invention.

FIG. 7 shows, in an exploded view, a fundamental construction of an AWD employed in embodiments in accordance with the present invention.

The AWD includes a light emitting array 10 including a plurality of light emitting elements, a waveguide array 20 including a plurality of waveguide 21 arranged on a substrate 22, and a light extracting means 30 including a transparent substrate 33 with a plurality of electrodes 34 formed thereon, a liquid-crystal sealing material 32, and a liquid-crystal layer 31 sealed by the liquid-crystal sealing material 32.

The constituent elements of the display are so configured that a light emitting element 11 thereof has an optical axis such that light enters the waveguide(s) at an edge section thereof. The electrodes 34 are formed on a surface of the transparent substrate 33 in contact with the liquid-crystal layer 31. A group of terminals 38 are also provided at two positions in a peripheral area of the transparent substrate 33.

As can be seen from FIG. 7, the AWD primarily includes the light emitting array 10, the waveguide array 20, and the light extracting means 30. First, description will be given of constitution and operation of the respective constituent components. Thereafter, operation of the overall system will be described.

AWD 20 and Light Extracting Means 30

FIGS. 8 and 9 show, in cross-sectional views respectively in a y-z plane and an x-z plane, constitution of the waveguide array 20 and the light extracting means 30.

The waveguide array .20 includes a stack of a light absorbing layer 23 and a layer of a material having a low refractive index (waveguide clad) which are formed on the substrate 22. On the stack, there are formed a region 21a of a rectangular shape in the x-z cross section plane with a material having a high refractive index (waveguide core) and a region 21b of a rectangular shape in the x-z cross section plane with a material having a low refractive index (waveguide clad). The regions 21a and 21b are alternately arranged as shown in FIG. 9.

The light extracting means 30 includes a transparent substrate 33, with a light scattering layer 36 on which a plurality of electrodes 34 are formed and also an alignment layer being formed on it, and the liquid-crystal layer 31 which is interposed between the waveguide array 20 and the transparent substrate 33. On the transparent substrate 33, there are formed a light scattering layer 36 and a plurality of electrodes 34 on the layer 36. Moreover, an aligning film or layer 35 is formed on the electrodes 34. In this structure, potential of each electrode 34 can be externally controlled in an independent fashion. The aligning layer 35 is disposed to align liquid-crystal molecules 31 in a predetermined direction when no electric field is applied thereto. On a surface of the transparent substrate 33 opposing to the liquid-crystal layer 31, an anti-reflection layer 37 is arranged.

The waveguide array 20 and the light extracting means 30 can be produced as follows. First, the light absorbing layer 23 is formed on the substrate 22. The layer 23 is then coated with a material of polymer, and then light waveguide array of polymer is formed by lithography. As for the material of polymer to be used, various kinds of polymer are available for the use of radiant energy region compared with materials to be used in infrared rays region for an optical communication which resistivity against heat of solder is also required. Therefore, the refractive index can be freely selected. Second, the liquid-crystal layer 31 is fixedly interposed between the light waveguide array and the transparent substrate 33. On the transparent substrate 33, the light scattering layer 36, wiring, and the aligning layer 35 are beforehand formed in this order. The resultant component thus produced can be rolled up with a radius of curvature of about several millimeters.

The waveguide array 20 and the light extracting means 30 operate as below. Light emitted from each light emitting element 11 shown in FIG. 7 enters a waveguide 21 and propagates through the high-refractive-index region (waveguide core) 21a, by repeating total reflection.

Next, description will be given of operation with a potential difference between a first electrode 34a and a second electrode 34b and operation without a potential difference therebetween.

Figure 10:
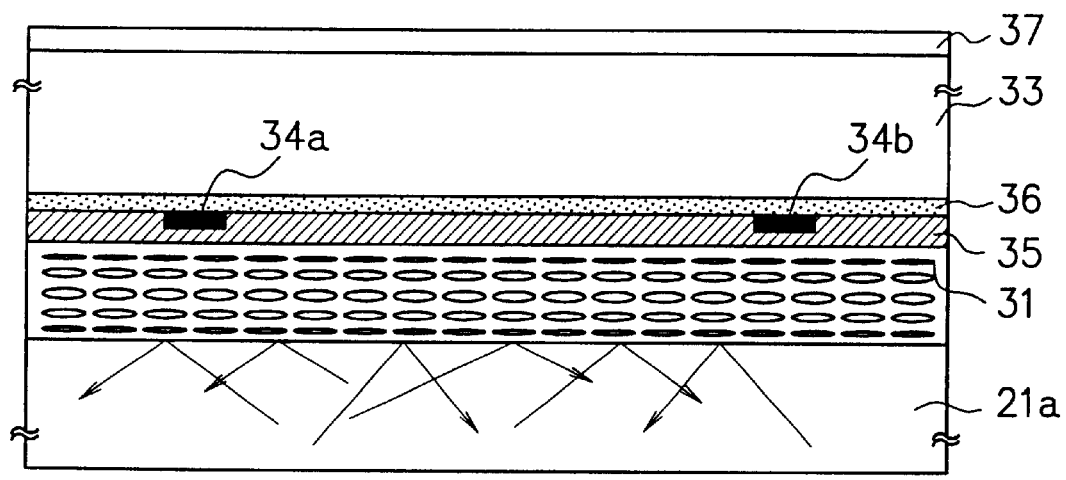
FIG. 10 is a cross-sectional view showing a state in which liquid-crystal molecules of a liquid-crystal layer of an AWD employed in embodiments in accordance with the present invention are aligned to be parallel to a substrate.

FIG. 10 shows, in a cross-sectional view, a state in which liquid-crystal molecules of a liquid-crystal layer 31 are aligned to be parallel to substrates 33. As shown in FIG. 10, when a potential difference does not exist between the first and second electrodes 34a and 34b, the liquid-crystal molecules are aligned in a direction substantially parallel to the substrate 33. For the light guiding through the high-refractive-index region. 21a, the liquid-crystal layer 31 has a refractive index of about 1.5 in this state. Therefore, the light does not enter the liquid-crystal layer 31.

Figure 11:
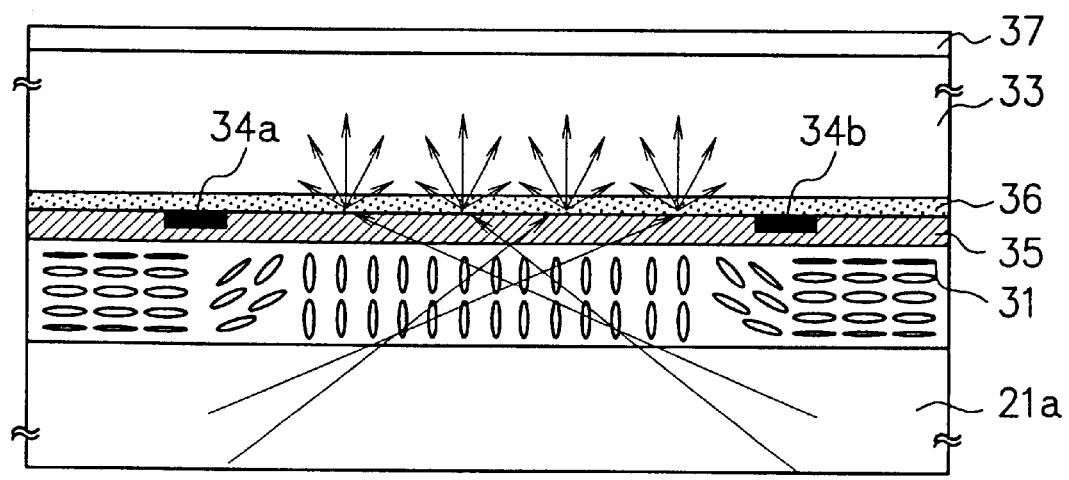
FIG. 11 is a cross-sectional view showing a state in which liquid-crystal molecules of the liquid-crystal layer of an AWD employed in embodiments in accordance with the present invention are aligned to be vertical to a substrate.

FIG. 11 is a cross-sectional view showing a state in which the liquid-crystal molecules are aligned to be vertical to the substrate 33. As can be seen from FIG. 11, when a potential difference appears between the first and second electrodes 34a and 34b, the liquid-crystal molecules are aligned in a direction substantially vertical to the substrate 33. The refractive index of the liquid crystal layer 31 for the light guiding through the high-refractive-index region 21a increases to about 1.7 in this state. Therefore, the light leaves the high-refractive-index region 21a and enters the liquid-crystal layer 31. The light propagates through the layer 31 to enter the light scattering layer 36 with an acute angle. The light is then scattered and diffused to reach the observer.

Subsequently, operation of the light emitting array 10 will be described.

In the light emitting array 10 including a linear arrangement of a plurality of light emitting elements, it is required to set an output from each light-emitting element in an independent manner. For this purpose, the output may be adjusted by an analog control operation. When the light-emitting element has a fully high response speed, the output may be adjusted by controlling a period of time at which the light-emitting element is turned on. Several techniques can be considered to implement the light emitting array 10. Description will be first given of a configuration in which an organic electroluminescence (EL) element is controlled by a polycrystalline silicon (poly-Si) thin-film transistor (TFT).

Figure 12:
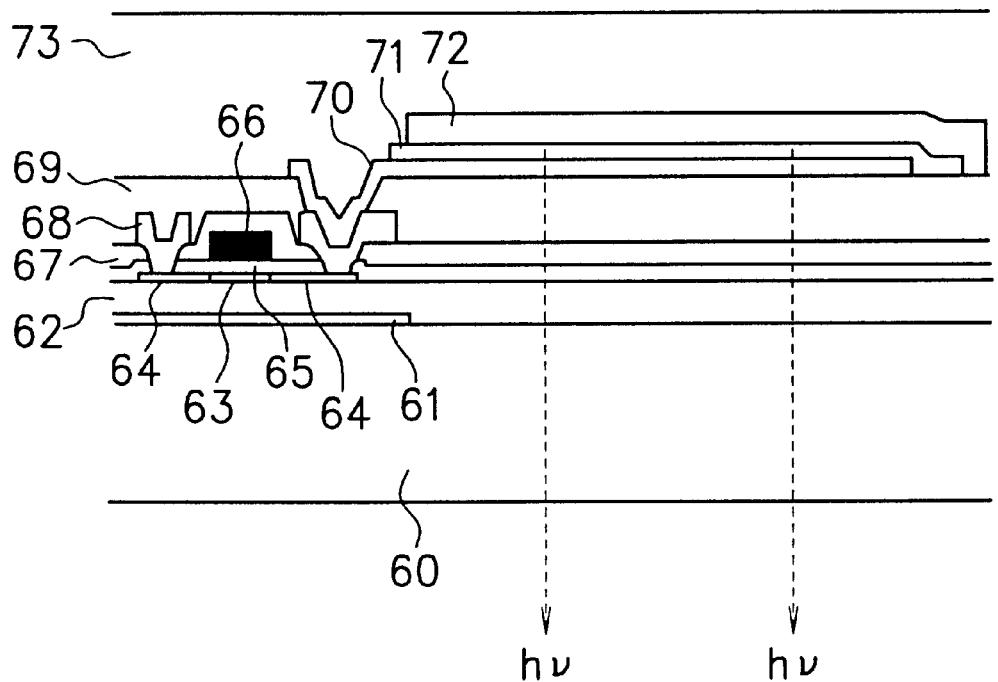
FIG. 12 is a cross-sectional view showing a configuration of a light emitting array of an AWD employed in embodiments in accordance with the present invention.

FIG. 12 shows a configuration of the light emitting array 10 in a cross-sectional view. The device 10 includes the light emitting element 11 formed on a transparent substrate 60 and a circuit to drive the light emitting element 11.

The light emitting element 11 is a two-terminal unit, i.e., a diode including a transparent electrode 70, a non-transparent electrode 72, and an organic EL layer 71 interposed between the electrodes 70 and 72. To prevent deterioration of the light emitting element 11 by influence of external moisture, a sealing layer 73 is arranged on an upper surface thereof. A portion of the transparent electrode 70 is connected to a TFT source/drain electrode 68. The, non-transparent electrode 72 is connected via a wiring, not shown, to an external device.

Figure 13:
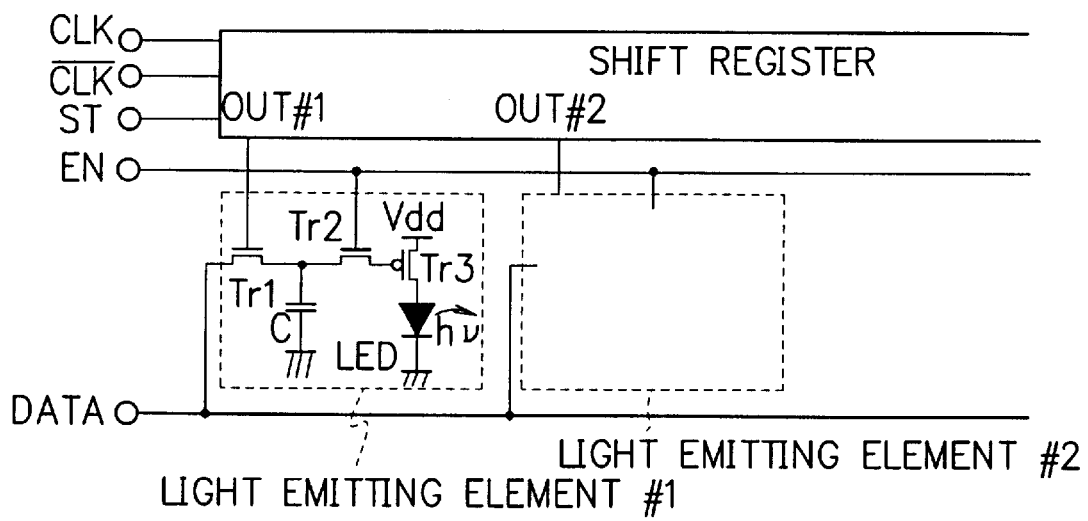
FIG. 13 is a circuit diagram showing a configuration of a light emitting array of an AWD employed in embodiments in accordance with the present invention.
Figure 14:
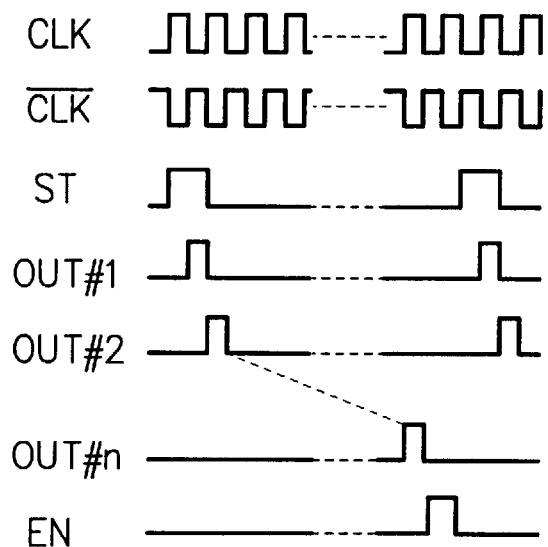
FIG. 14 is a signal timing chart showing operation of a light emitting array of an AWD employed in embodiments in accordance with the present invention.

FIG. 13 shows a configuration of the light emitting array 10 in a circuit diagram. FIG. 14 is a signal timing chart showing operation of the device 10.

The light emitting element 11 is assigned with a symbol of LED, and a TFT connected to a port of the section 11 to supply a current thereto is assigned with a symbol of Tr3. As shown in FIG. 13, the circuit system includes a capacitor C to hold a gate of Tr3 at a fixed potential, a transistor Tr2 to charge the capacitor C up to a desired voltage corresponding to a video signal, and a switch Tr to transfer the potential of the capacitor C to the gate of Tr3. The transistor Tr3 includes a drain electrode connected to a power source Vdd. A section enclosed with a dotted line in FIG. 13 will be referred to as a light emitting element herebelow.

As shown in FIG. 13, the circuit system includes a plurality of light emitting elements arranged in a linear form and a TFT driver circuit to drive the light emitting elements. The TFT circuit includes a poly-Si TFT and favorably includes a configuration of a complementary metal-oxide semiconductor circuit including an n-type TFT and a p-type TFT.

Next, operation of the light emitting array 10 will be described. Control signals such as a clock signal CLK and a signal ST are fed to a shift register circuit to sequentially set Tr1 of each light emitting element to a waveguide array state beginning at a first light emitting element. At timing synchronized with this operation, when a video signal DATA to be displayed is supplied to the circuit, a video signal is written in each capacitor C. After video signals is written in all light emitting elements, a signal EN is delivered to the circuit to simultaneously set Tr2 of each light emitting element to a waveguide array state. As a result, a desired current corresponding to the respective video signal is fed to a light emitting diode (LED) of each light emitting element. Resultantly, light is emitted from the organic EL layer 71 toward the transparent substrate 60.

In this fashion, a desired light emission pattern can be obtained. In the configuration, Tr3 continuously feeds a current to the LED even if Tr2 is in a non-waveguide array state. Therefore, while the video signals are being written in the respective capacitors C, a current corresponding to a video signal previously written flows through the associated LED. By supplying a signal EN to the circuit, the quantity of light of all light emitting elements can be changed at the same time.

To display an image in color, it is only necessary to use a light emitting array 10 which produces three primary colors red (R), green (G), and blue (B). Such a light emitting array 10 can be implemented by a combination of a color filter and a white light emitting material, a combination of a blue light emitting material and a color changing material, or a parallel arrangement of light emitting materials of three colors.

In place of the organic EL material, there may be employed a light emitting diode made of an inorganic material in a rectangular form of which each edge or side ranges from about 20 micrometers ($\mu$m) to about 300 $\mu$m. For example, an LED is formed using a material of AlGaInP or the like on an n-type substrate such as GaP. In the LED of such an inorganic material, the quantity of light is increased when compared with the case in which the organic EL layer is used. This consequently leads to an advantage that luminance of the display becomes higher and brightness of the emissive display is increased. However, this requires a process in which inorganic light emitting diodes are regularly arranged and are bonded to each other, which increases the production cost of the device. On the other hand, for the device including the organic EL layer, many elements can be produced at a time in film forming processes such as spin coating. This is quite advantageous particularly when the device includes a very large number of light emitting elements.

Subsequently, description will be given of the overall operation of the display of waveguide array type.

First, a video signal corresponding to a first column of an image to be displayed is written in the capacitors C of the light emitting elements of the light emitting array 10. Thereafter, when a signal EN is supplied to the circuit, the light emitting array 10 emits light of a pattern corresponding to the first column of a display area. The light from each light emitting element enters an associated waveguide to propagate therethrough. At the same time, a control signal is supplied to the electrode 34 at the first column of the display area to change alignment of liquid-crystal molecules in an associated location of the liquid-crystal layer 31. In this manner, the light emitted from the light emitting array 10 is acquired only from the first column of the display area. By repeatedly guiding the operation, a desired image can be displayed.

At any moment of the display operation, light comes from only one column of the display area. However, the observer receives an ordinary two-dimensional image by a phenomenon of residual images, which is the case with, for example, a liquid-crystal display, a cathode-ray tube (CRT), or a laser display of a simple matrix driving operation.

Assume that light is attenuated in the waveguide 21 to a level which cannot be ignored. In the image displayed in this situation, the farther the column from the light emitting array 10 is, the darker is the column. When the overall area is displayed, for example, in white, there may appear smooth black and white. It is considered that the light attenuation in the light emitting element 21 takes place by abnormality in the contour of the interface between the high-refractive-index region 21a and a low-refractive-index region 21b and/or characteristics of the material of the light emitting element 21. Therefore, this problem can be mitigated or removed by improving production processes and/or by appropriate selection of materials. If necessary, the quantity of light attenuation can be correctly measured for each light emitting element 21. Consequently, the problem can be removed by beforehand correcting the video signal according to the measured values.

Figure 15:
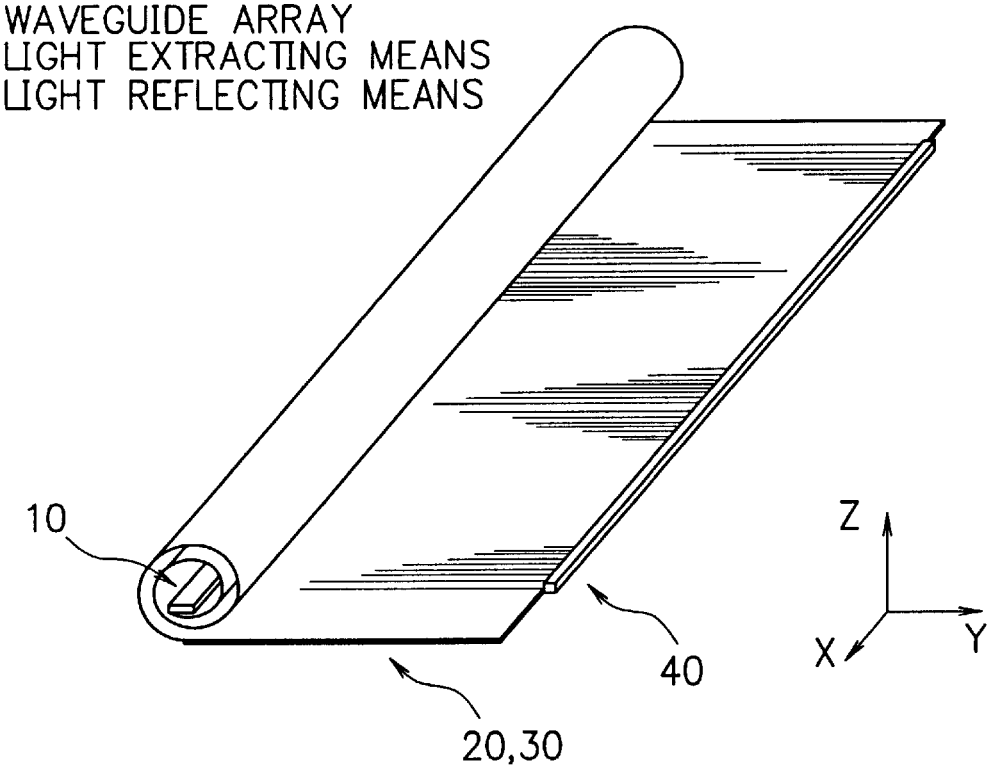
FIG. 15 is a perspective view showing a configuration of a rollable AWD employed in the first embodiment in accordance with the present invention.

As can be seen from the description above, the waveguide array 20 and the light extracting means 30 are fabricated using thin and flexible materials and hence can be wound up. FIG. 15 shows a configuration of a rollable display of an AWD in a perspective view. When the total thickness of the waveguide array 20 and the light extracting means 30 is, for example, 0.7 mm, a length of about 25 centimeters (cm) thereof can be wound up to be stored in a cylindrical container having an inner diameter of about 14 mm.

Using the poly-Si TFT technique and the organic EL technique can fabricate the light emitting array 10 fabricated in quite a small contour with a thickness of about 0.7 mm to about 2 mm and a width of about 1 mm to about 2 mm. Therefore, the light emitting array 10 can be disposed at a position on which the light emitting array 20 and the like can be wound up. Naturally, as distinct from the configuration of the light emitting array 10 and a light reflecting device 40 of FIG. 15, the light reflecting device 40 may be disposed at a center of the rolling. In this case, there is additionally disposed an element such as a conductor to supply power to the light emitting array arranged at a position of the light reflecting device 40 shown in FIG. 15.

Variation of First Embodiment

To conduct a partial display operation using the window of the first embodiment of the mobile terminal device including the display of waveguide array type, it is only necessary for the light extracting means 30 to supply an electric field only to the area of the window to acquire light therefrom. When the user draws the waveguide array display up to an intermediate point thereof, it is only necessary to acquire light only from the area of the display in the outside space. In this case, the light emitting array 10 is favorably arranged at an outer edge of the display wound up in a roll.

Figure 16:
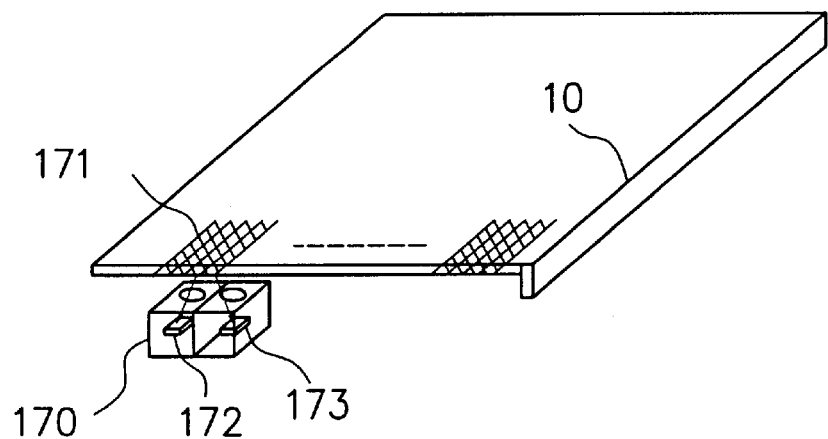
FIG. 16 is a perspective view showing a configuration of a position detecting device in a variation of the first embodiment in accordance with the present invention.
Figure 17:
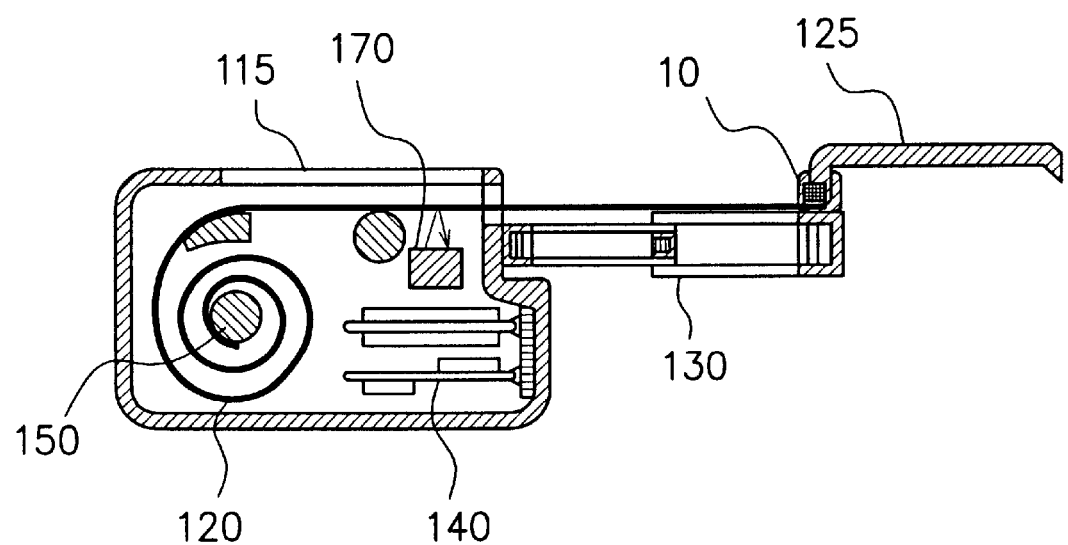
FIG. 17 is a cross-sectional view showing a configuration of the positioning detecting device in a variation of the first embodiment in accordance with the present invention.

FIG. 16 shows in a perspective view a configuration of a positioning detecting device in a variation of the first embodiment in accordance with the present invention. FIG. 17 is a cross-sectional view showing a configuration of the positioning detecting device in a variation of the first embodiment. In a section of the rollable display of waveguide array type, a black and white pattern 171 is formed. A photo-coupler 170 is arranged in the proximity of the extending slit 160. The photo-coupler 170 detects distance of the display device drawn by the user by reading the black and white pattern 171. Concretely, light emitted from an LED 172 disposed in the photo-coupler 170 is radiated onto the black and white pattern 171, and light reflected from the pattern 171 enters a phototransistor 173. The phototransistor 173 produces a signal. According to this signal, a position of the black and white pattern 171 at which the light reflected is determined.

The light extracting means 30 acquires light only from an area corresponding to the distance measured by the photo-coupler 170. Therefore, when the display is partially drawn for a display operation, power consumed by the display can be reduced.

The display device which can be stored in a narrow cylindrical container is quite practical as a portable device, for example, the user can put the display device in a pocket. Downsizing of a radio transmitter/receiver circuit, a CPU, a memory, and the like mounted on a portable telephone is in process at present. If these circuits can be housed in a space having a volume of a pen point, a pen-type portable telephone will be expectedly produced. It is to be appreciated that the present invention is not limited to the portable telephone. The present invention is related to a technique to store display devices of various apparatuses in a small container and hence considerably changes the configuration and size of the portable apparatuses.

Fourth Embodiment

Figure 18:
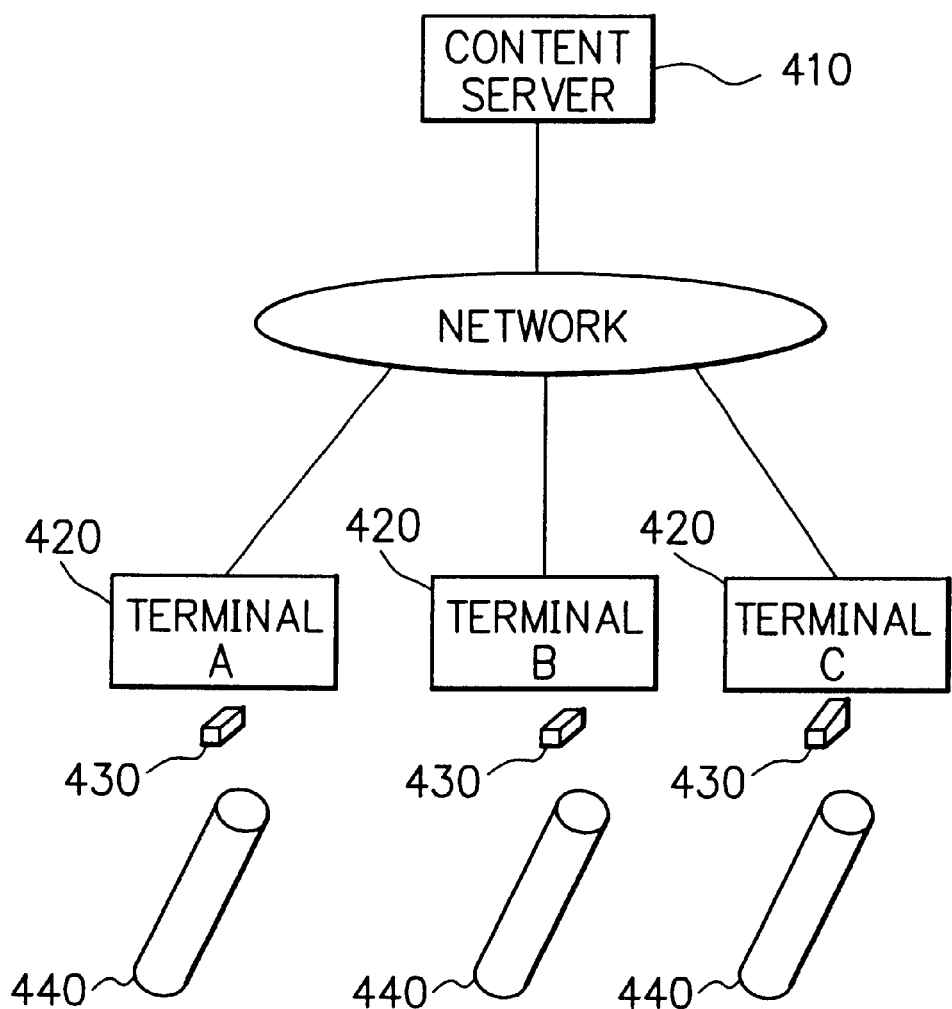
FIG. 18 is a block diagram showing a configuration of a content distribution system in a fourth embodiment in accordance with the present invention.

Description will now be given of a content distribution system employing the mobile terminal device including the AWD described above. FIG. 18 shows in a block diagram showing a configuration of a content distribution system in a fourth embodiment in accordance with the present invention.

The content distribution system includes a content server 410, store terminals 420, and mobile terminals 440.

The content server 410 downloads various contents such as newspapers, a sports newspaper, magazines, comic books and teaching materials, and television (TV) programs via a network onto each store or distributor (e.g. convenience store, shop) terminal 420. The contents are not limited to texts. Various media such as audiovisual information, still pictures, and moving pictures can be provided. The network includes the Internet and/or a leased communication line.

A clerk of the store 420 operates the store 420 to record the downloaded contents on a predetermined storage medium 430. The storage medium 430 is a small-sized large-capacity medium such as a memory stick.

When user inserts a storage medium 430 which the user bought in the store into an extension unit, the mobile terminal 440 including an AWD reproduces the contents of the storage media 430. The mobile terminal 430 is a key device in accordance with the embodiment.

The display is fabricated according to various techniques regarding the waveguide path, the TFT circuit, and the light emitting element array. In the display, light which is emitted from the light emitting element array and which enters a polymer light guiding path is acquired from a selected row to be fed to an outside space so as to display an image. The display is advantageous in that the display is thin and light-weighted. Moreover, the display is strong, that is, even the user drops the display on the floor, the display is not destroyed. Additionally, the display can be rolled up to be stored in a container when it is not used and can be manufactured at a low cost.

The liquid-crystal display generally used in the ordinary portable terminal device has a thickness of at least two sheets of glass. Furthermore, the backlight or reflective display requires a front light, and hence it is difficult to reduce the thickness of the liquid-crystal display down to a range from about 2 mm to about 3 mm. On the other hand, the thickness of the AWD can be minimized to about 100

μm. These advantages are quite favorable when the display is applied to a portable terminal device.

When a rollable display (AWD) is mounted on a portable terminal device, the display area can be greater than the outside contour of the portable terminal device. To put the portable terminal device in a pocket, the terminal device is favorably in the shape of a stick. A stick-type terminal using the AWD is quite superior in portability. The display area thereof can exceed the outside size of the terminal device. The stick-type terminal device having such a large display area can be suitably used as an electronic book and/or a browser. Such applications are not comfortable for the user when the usual portable telephone or the general PDA is used.

The user pulls the AWD having the above advantages from the mobile terminal device and enjoys contents. Since a supporting device is disposed on the rear side of the display, the user can continuously hold the terminal device 440 by one hand even in a jammed train.

The content distribution system in the embodiment can be downloaded directly from the content server 410 via radio communication onto the mobile terminal 440. Such a configuration is attended with two problems. First, when the content is of a large capacity, the download takes a long period of time. Therefore, a long period of radio communication and hence the cost is increased. Particularly, in consideration of the capacity of the battery installed in the mobile terminal 440, it is favorable to possibly minimize the communication time for the download. Second, the download is limited in an area, for example, in a subway train in which the electric wave cannot be received or is quite weak.

In general, the sense of paying money for information has not been so penetrated into people's minds as compared with the sense of paying money for an ordinary item. Additionally, there also arises a problem regarding the charging. That is, the user feels a sort of uneasiness when the receiving of the content and the payment for the content are not carried out at the same time.

To overcome the difficulty, the embodiment adopts a method in which the user purchases the content recorded on the storage medium 430. That is, the content of a large capacity such as a newspaper or a magazine as mentioned-above is beforehand stored on the storage medium 430 and is then supplied to the user. Particularly, when there exists a useful content(s) to complement the content recorded on the storage medium 430, the user directly downloads the complementary content via radio communication. For example, the user obtains information of a map indicating a location of a movie theater via the storage medium 430 and information of a schedule of the movie theater via radio communication. In another example, the user attains data indicating changes of stock prices in the past and management indices of respective firms via the storage medium 430 and the stock prices at present via radio communication.

Next, description will be given of operation of the content distribution system in the embodiment. FIG. 19 shows in a flowchart a content distribution method for use with the content distribution system of the embodiment.

First, the content server 410 generates a content of, for example, sports news (step S400). In the operation, the content also includes an advertisement of the firm contracted as the sponsor. Next, the content server 410 transmits the content to each store (distributor) terminal 420 (step S401).

In each store, the content downloaded onto the store terminal 420 is copied onto a predetermined storage medium 430 (step S402). In this situation, a storage medium collected through the recycling is used as the storage medium 430 if possible.

At a store, the user buys the storage medium 430 on which his or her favorite content is recorded (step S403). The user installs the storage medium 430 in a mobile terminal 440 including a waveguide array display to enjoy the content (step S404).

Variation of Fourth Embodiment

The storage medium 430 can be supplied not only from the store, but also from a convenience store, a bookstore, and the like. The storage medium 430 may also be sold via a vending machine.

It is also possible to use a storage medium 430 dedicated for a particular person to download contents onto the storage medium 430. In this case, as compared with a method in which the storage medium 430 itself is purchased, the system can be configured with reduced resources. Moreover, complex operations of the recycling can be avoided.

The mobile terminal including an AWD may be provided or supplied using a rental system. In this case, a user who has contracted with a terminal provider for a regular purchase of contents can rent a mobile terminal. The terminal may be a simple display for content reproducing without any communication function only if the terminal includes the AWD.

In the rental system, contents are supplied to the contacted user, for example, as follows. Prepaid information such as the number of uses is recorded on a commutation ticket. When the user installs the ticket in an automatic ticket inspecting machine, the machine reads the prepaid information. According to the information, the storage medium 430 is supplied to the user via the ticket receiving slit when the commutation ticket is returned to the user from the ticket receiving slit.

This method removes complicated operation for the user to daily purchase a storage medium 430 in a store, or the like. When the data writing speed on the storage medium 430 is increased, necessary information may be written on a storage medium 430 by the automatic ticket inspecting machine.

In another method, contents may be copied onto the storage medium 430 using a personal computer via a telephone line or a cable of his or her house. This method is advantages in that a large amount of contents can be obtained without paying attention to the period of time for communication and the contents can be downloaded in a time zone of a lower communication cost.

The content distribution method can be implemented by a program for the content server 410, the store terminals 420, and the mobile terminals 440. The program is recorded on a magnetic storage medium, an optical storage medium, or a semiconductor storage medium to be supplied to each constituent component of the system. Alternatively, the program may be downloaded onto each respective constituent component via a network using a file transfer protocol (FTP).

The embodiments described above are examples suitable to embody the present invention and hence do not restrict the present invention. The embodiments can be modified in various fashions within a scope of the present invention.

As can be seen from the description, in accordance with the present invention, there can be implemented a mobile terminal device in which by the display area is increased and the overall size of the device is minimized by using a display of waveguide array type (AWD).

By using a mobile terminal device including an AWD, there can be provided media which can be used in a commuting train or the like in place of media of paper such as a newspaper and a magazine, and hence a new content distribution system can be developed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile terminal device, comprising:
   a thin-film arrayed waveguide display (AWD);
   a winding device for rolling up the display in a housing and storing the display therein; and
   a position detecting device near a slit for detecting a boundary of the display, between an area of the display in the housing and an area thereof outside the housing, wherein the position detecting device emits light onto a black and white pattern formed on a predetermined area of the display, receives light reflected from the black and white pattern, and detects the boundary according to the reflected light.

2. The mobile terminal device in accordance with claim 1, wherein the display comprises:
   a light emitting array including a plurality of light emitting elements for emitting light for displaying image by line-by-line basis,
   a light guiding array for guiding light from one end to the other end through the light guiding array, and
   light extracting means for extracting the light propagating through the light guiding array from an arbitrarily selected area of the light guiding array.

3. The mobile terminal device in accordance with claim 2, wherein the light guiding array is made of a material of polymer.

4. The mobile terminal device in accordance with claim 1, further comprising supporting arms of folding type for supporting the display being extended from the housing.

5. The mobile terminal device in accordance with claim 1, further comprising a window through which a partial image of the display is displayed when the display is rolled up in the housing.

6. The mobile terminal device in accordance with claim 1, further comprising:
   a slit in the housing; and
   a tab disposed at an end of the display for extending the display through the slit.

7. The mobile terminal device in accordance with claim 1, further comprising control means for displaying the image only on the area of the display being extended outside the housing, according to a result of the position detection by the position detecting device.

8. The mobile terminal device in accordance with claim 1, further comprising an extension unit for connecting a predetermined external device and a storage medium for storing a predetermined content.

9. The mobile terminal device in accordance with claim 2, wherein the light emitting array is disposed at an end of the display opposing to the end fixedly attached to a central axis of the rolling device.

10. The mobile terminal device in accordance with claim 1, wherein the housing has a contour of a stick.

11. A content distribution system, comprising:
    a content server for generating a content and for providing the content via a network;
    a distributor terminal for downloading the content from the content server;
    a mobile terminal device including an arrayed waveguide display for reproducing the content copied into a storage medium at the distributor terminal and a winding device for rolling up the display in a housing and storing the display therein; and
    a position detecting device near a slit for detecting a boundary of the display, between an area of the display in the housing and an area thereof outside the housing, wherein the position detecting device emits light onto a black and white pattern formed on a predetermined area of the display, receives light reflected from the black and white pattern, and detects the boundary according to the reflected light.

12. A content distribution system in accordance with claim 11, wherein the display comprises:
    a light emitting array including a plurality of light emitting elements for emitting light for displaying image by line-by-line basis;
    a light guiding array for guiding light from one end to the other end through the light guiding array; and
    light extracting means for extracting the light propagating through the light guiding array from an arbitrarily selected area of the light guiding array.

13. The content distribution system in accordance with claim 11, wherein the content includes data of a moving picture.

14. The content distribution system in accordance with claim 11, wherein the distributor terminal is a store terminal.

15. A content distribution method, comprising the steps of:
    generating a content by content server and providing the content via a network to a distributor terminal;
    copying a content, provided by the content server and downloaded by the distributor terminal, onto a storage medium;
    reproducing the content copied on the storage medium on an arrayed waveguide display;
    winding the display in a housing and storing the display in the housing; and
    detecting a boundary of the display by emitting light onto a black and white pattern on a predetermined area of the display and receiving light reflected from the black and white pattern.

16. The content distribution method in accordance with claim 15, wherein the display comprises:
    a light emitting array including a plurality of light emitting elements for emitting light for displaying image by line-by-line basis;
    a light guiding array for guiding light from one end to the other end through the light guiding array, and
    light extracting means for extracting the light propagating through the light guiding array from an arbitrarily selected area of the light guiding array.

17. The content distribution method in accordance with claim 15, wherein the content includes data of a moving picture.

18. The content distribution method in accordance with claim 15, wherein the distributor terminal is a store terminal.

19. A program executing a content distribution method, the program executing the processing of:
    generating a content by content server and providing the content via a network to a distributor terminal;
    copying a content, provided by the content server and downloaded by the distributor terminal, onto a storage medium;

reproducing the content copied on the storage medium on an arrayed waveguide display;

winding the display in a housing and storing the display in the housing; and detecting a boundary of the display by emitting light onto a black and white pattern on a predetermined area of the display and receiving light reflected from the black and white pattern.

20. The program executing a content distribution method, in accordance with claim 19, wherein the display comprises:

a light emitting array including a plurality of light emitting elements for emitting light for displaying image by line-by-line basis;

a light guiding array for guiding light from one end to the other end through the light guiding array, and light extracting means for extracting the light propagating through the light guiding array from an arbitrarily selected area of the light guiding array.

21. The program executing a content distribution method in accordance with claim 19, wherein the content includes data of a moving picture.

22. The program executing a content distribution method in accordance with claim 19, wherein the distributor terminal is a store terminal.

* * * * *